Patented Feb. 18, 1936

2,030,940

UNITED STATES PATENT OFFICE 2,030,940

MOTOR FUEL PRODUCTS

Thomas H. Rogers and Vanderveer Voorhees, Hammond, Ind., assignors, by mesne assignments, to Gasoline Antioxidant Company, Wilmington, Del., a corporation of Delaware No Drawing. Application June 25, 1934, Serial No. 732,380

8 Claims. (Cl. 44—9)

The present invention relates to improvements in hydrocarbon motor fuel products of the character of gasoline, and has to do more particularly with motor fuel products derived by the cracking of higher boiling hydrocarbon oils of such types as display a tendency to form gum or resinification products on storage, even after refining treatment with a dilute sulfuric acid such as sulfuric acid of 75% strength or lower. This tendency may be indicated by an accelerated test designated hereinafter as the oxygen absorption test, which is a measure of the potential gum formation or resinification properties of the motor fuel products.

In methods of cracking high boiling hydrocarbon oils to produce lower boiling hydrocarbon oils, the products which have been secured may in general be grouped in two classes; the first, which at the present time forms the bulk of pressure cracked gasoline, having an anti-knock value somewhat greater but not substantially greater than straight-run gasoline; a somewhat lower Baumé gravity than straight-run gasoline; containing a moderate proportion of unsaturated compounds as determined by combined absorption and polymerization by sulfuric acid in accordance with the method of determination hereafter set forth; and being in general of such a character that the constituents thereof which tend to form gum on storage and handling are readily removed by treatment with sulfuric acid to produce a product comparable in that respect to straight-run gasoline. Motor fuel products of the second general class, hitherto derived principally from vapor phase processes or very high temperature pressure cracking processes, have anti-knock values substantially higher than straight-run gasoline; have a much lower A. P. I. gravity; contain large amounts of unsaturateds as determined by sulfuric acid absorption and polymerization; and require excessive treatment with sulfuric acid, with very substantial losses, to remove potential gum-forming constituents.

Although it cannot be said that there is a hard and fast line between the two types of products, the former type of product, with 425° F. end point, will in general have an anti-knock value not exceeding an equivalent of 1.2 cubic centimeters of tetra-ethyl lead per gallon of straight-run Mid-Continent gasoline; an olefin content as determined by sulfuric acid absorption and polymerization of not over 40%; an A. P. I. gravity of 56 to 59°; and an oxygen absorption induction period greater than 125 minutes, as determined by the test hereafter set forth. The second type of product, which may be designated as the vapor phase type, will in general have an anti-knock value equivalent to at least 1.2 cc. tetra-ethyl lead per gallon straight-run Mid-Continent gasoline, an A. P. I. gravity of about 49 '¬ 55°; an unsaturated content as determined by sulfuric acid absorption and polymerization exceeding 40%, and usually above 45%; and an oxygen absorption induction period of less than 125 minutes.

The latter type of product in general tends to form gum, even on storage in the dark, and under like conditions tends to lose its anti-knock properties. The same tendencies may exist, to a greater or less extent, in products of the first mentioned type and, the present invention may be employed in connection therewith, although particularly intended for use in connection with products of the so-called vapor phase cracked type. These cracked fuels also tend to become colored upon exposure to light.

Thus, products of certain processes commonly designated as liquid phase or liquid-vapor phase cracked products, although having a lower unsaturated content than vapor phase cracked products, as shown by combined absorption and polymerization by sulfuric acid, have gum-forming properties similar to those of vapor phase cracked products. The present invention may be applied in connection with such products, as well as with such highly cracked products as are derived by drastic or high temperature cracking or destructive distillation of bituminous materials, such as coal, peat, lignite, and the like.

In determining the oxygen absorption induction period, by which an indication of the potential gum-forming properties of the gasoline on storage and handling may be secured, the following procedure may be employed; 100 cubic centimeters of the motor fuel or gasoline to be tested are placed in a one liter flask, the total volumetric capacity of which is 1150 to 1200 cubic centimeters. The gasoline is maintained at about 212° F. by heating in a steam bath while an oxygen atmosphere is maintained in the flask under a substantially constant pressure of about 2½ atmospheres. The flask is vigorously agitated and the volume of oxygen absorbed is measured at frequent intervals.

The oxygen absorption is characterized by an initial period in which relatively small amounts are absorbed and subsequent to this period there is a rapid increase in the rate of absorption. This initial period of slow absorption is designated as the induction period, and its end is regarded as the point at which oxygen absorption under the conditions stated reaches a rate of 1 cubic centimeter per minute. If the oxygen absorption is plotted against the time in minutes with equal distances on the coordinates for time in minutes and absorption in cubic centimeters, it will be evident that the end of the induction period will be indicated upon the curve by the point where the tangent to the curve has a slope of 45°. The length of the induction period, as determined by this test, provides a fairly accurate indication of the potential gum-forming behavior of the motor fuel product on storage and handling.

The motor fuel products with which the present invention is primarily concerned, are produced from cracked distillate products of the vapor phase cracked type which, after treatment with dilute sulfuric acid of 50 to 70% strength, have an oxygen absorption induction period of less than 125 minutes. The following procedure has been employed in producing such a product.

A hydrocarbon oil, preferably a distillate product heavier than gasoline, is forced through a continuous coil in a heating zone and brought therein to an outlet temperature of 825 to 975° F. while maintaining thereupon a pressure exceeding 200 lbs. under conditions to produce from 15 to 35% of hydrocarbons in the gasoline boiling point range in the products leaving the coil. The material leaving the coil is preferably reduced in pressure and fractionally condensed to separate the hydrocarbons in the gasoline range of boiling points as a distillate. The vaporization is controlled, or the distillate product may be rerun, to produce a material conforming to the desired specifications, for example, of 425° F. end point. Such a material has a gravity of 48 to 56° Baumé as compared with 58 to 60° Baumé for a straight-run gasoline of similar boiling range from Mid-Continent crude. The product, without treating, is found to have an oxygen absorption induction period of about 35 to 70 minutes. It is suitably treated with dilute sulfuric acid, say 60% acid, to the extent of 6 lbs. of such acid per barrel of distillate. The loss on treating is about ½%, the color of the product is not substantially altered, but is substantially stabilized and the oxygen absorption induction period is increased to 80 to 90 minutes. In determining the unsaturateds in such a product it shows a combined absorption and polymerization loss of 50% to 70% when the test is made with 90% sulfuric acid. This loss is determined by subjecting a given volume of the material to treatment at room temperature with two volumes of 90% sulfuric acid, separating the remaining oil from the acid layer and redistilling the unabsorbed oil to produce a distillate having the same end point as the original material treated. The loss in volume relative to the original material is that which is designated as the combined absorption and polymerization loss.

A treated distillate product, produced as hereinbefore described or other cracked product having a tendency to form gum, color or resinification products on storage, is treated by adding thereto a small proportion of an organic inhibiting agent or antioxidant having reducing properties and containing an aromatic polyamine radical. Such substances are employed in proportions of, in general, less than 0.1% and preferably less than 0.05%. This stabilization is indicated by an increase in the oxygen absorption induction period of the product to which they are added. As examples of such materials, we may employ the phenylenediamines, homologous compounds such as the methyl and ethyl phenylenediamines, aminodimethyl aniline, and other compounds of this class such as aminoazobenzene, para-aminoazobenzene, para-hydroxy azobenzene and other amino and hydroxy substituted azobenzenes, naphthalene diamine and the like.

The specific activity of these materials varies to a considerable extent, all of them, however, being effective in inhibiting the gum-forming properties of the motor fuel product and preventing its deterioration, for example by decrease of its anti-knock value, and these properties are indicated by an increase in the induction period of the product. It is preferred to employ those which, when added to a vapor phase type of product as hereinbefore described, in proportions not exceeding 0.05%, will increase the induction period to above 125 minutes and preferably to 300 minutes or more. Thus, with a product such as that above described, and which, after dilute acid treatment, has an induction period of 55 minutes and a lead equivalent of 1.7 cubic centimeters tetraethyl lead per gallon of straight-run Mid-Continent gasoline, the addition of 0.01 to 0.02% of meta- or para-phenylenediamine increases the induction period to 160 to 175 minutes, and to 440 minutes respectively. 0.0005% of 2,4-diamino phenol increases the induction period of a similar product to about 130. Para-aminodimethyl aniline, added in the proportion of 0.003%, increases its induction period to above 150; and 0.01% of para-aminodiethyl aniline increases its induction period to about 200. In another sample of cracked gasoline having an induction period of 55 minutes, 0.005% of para-aminoazobenzene raised the induction period to 100 minutes.

The results secured by the application of the oxygen absorption test, as hereinbefore described, definitely indicate the behavior of the motor fuel product on storage, both in its tendency to form gum and to lose its anti-knock value.

If desired, the anti-knock value of the motor fuel described herein may be increased by the addition of small amounts of tetraethyl lead or other suitable material and it is intended that the accompanying claims shall include the products of the type herein set forth regardless of the addition thereto of tetraethyl lead or other materials modifying their fuel characteristics.

This application is a continuation in part of our co-pending application Serial 438,246, filed March 22, 1930 and our co-pending application Serial 437,416, filed February 10, 1930.

We claim:

1. A motor fuel comprising unsaturated hydrocarbons which normally tend to deteriorate upon storage by gum formation, and stabilized against such gum formation by having incorporated therein a small amount of a gum inhibitor selected from the group consisting of an aromatic amino azo compound and an aromatic hydroxy azo compound, said amount being sufficient substantially to retard such deterioration.

2. A motor fuel comprising unsaturated hydrocarbons normally tending to deteriorate upon storage by forming gum, and stabilized against such deterioration but having incorporated therein a small amount of an aromatic hydroxy azo compound, said amount being sufficient substantially to retard such deterioration.

3. The method of preserving cracked hydrocarbon distillates which deteriorate and develop gums on storage, by incorporating therein a small proportion of an aminoazobenzene.

4. The method of preserving cracked hydrocarbon distillates which deteriorate and develop gums on storage, by incorporating therein a small proportion of a hydroxy azobenzene.

5. A motor fuel product comprising cracked hydrocarbon distillates which tend to deteriorate and develop gums, said product containing a small proportion of an aminoazobenzene.

6. A motor fuel product comprising cracked hydrocarbon distillates which tend to deteriorate and develop gums on storage, said product containing para hydroxy azobenzene in an amount not exceeding about 0.05% to inhibit gum formation therein.

7. A cracked low boiling hydrocarbon oil, normally tending to deteriorate upon storage by gum formation and discoloration, stabilized against such deterioration by the addition thereto of a small amount of an aromatic amino azo compound, said amount being sufficient substantially to retard such deterioration.

8. A motor fuel product comprising cracked gasoline which normally tends to deteriorate and develop gum on storage, containing para amino azo benzene dissolved therein in an amount not exceeding 0.05% to inhibit said gum formation.

THOMAS H. ROGERS.
VANDERVEER VOORHEES.

tion therein.

CERTIFICATE OF CORRECTION.

Patent No. 2,030,940. February 18, 1936.

THOMAS H. ROGERS, ET AL.

It is hereby certified that error appears in the printed specification of the above numbered patent requiring correction as follows: Page 2, second column, line 53, for the serial number "437,416" read 427,416; and that the said Letters Patent should be read with this correction therein that the same may conform to the record of the case in the Patent Office.

Signed and sealed this 7th day of April, A. D. 1936.

(Seal)

Leslie Frazer
Acting Commissioner of Patents.